3,631,076
PROCESS FOR PREPARING 16-UNSATURATED
STEROIDS
Ludwig Salce, Clark, George G. Hazen, Westfield, and Erwin F. Schoenewaldt, Watchung, N.J., assignors to Merck & Co., Inc., Rahway, N.J.
No Drawing. Filed May 14, 1969, Ser. No. 824,658
Int. Cl. C07c 167/14
U.S. Cl. 260—397.45
9 Claims

ABSTRACT OF THE DISCLOSURE

A process for preparing 16-unsaturated steroids from 17α-hydroxy steroids of the pregnane series by heating the 17α-acyloxy derivative with a metal salt of a lower alkanoic or aromatic acid in a polar organic solvent. A novel compound, pregna-1,4,16-triene-3,20-dion-11β,21-diol diacetate is disclosed. The adrenocortical steroids produced have anti-inflammatory and anti-allergenic properties.

---

This invention relates to a process for preparing 16-unsaturated steroids from 17α-hydroxy steroids. More particularly it relates to a process of preparing 16-unsaturated steroids from 17α-hydroxy steroids. This process is specific to the 17α-hydroxy substituent; other hydroxy groups on the molecule are not affected by the reaction conditions.

Although the prior art has proposed methods for converting corticoids (i.e., steroids of the pregnane series having a 17α-hydroxy substituent) to 16-unsaturated steroids, these are generally unsatisfactory when other hydroxy groups are present, especially the 11β-hydroxy group. For instance, reaction of 17α-hydroxy steroids with thionyl chloride proceeds in low yield, with loss of the 11β-hydroxyl group, if it is present.

It has now been discovered that a 17α-hydroxy steroid, after esterification to the 17α-alkanoyloxy or aroyloxy derivatives can be reacted in good yield with a metal salt of a lower alkanoic or aromatic acid, in a polar organic solvent, to produce the 16-unsaturated steroid. The 11β-hydroxy group, or other hydroxy groups which may be present are not removed during the reaction.

The 16-unsaturated steroids of the pregnane series produced by this inventive reaction are useful as anti-inflammatory and anti-allergenic compounds. They are especially effective in the treatment of arthritis and related diseases since they can be administered for their cortisone-like action in low dosage thereby minimizing undesired side-effects.

The above defined steroid compounds are administered to the patient in a dosage unit form, a pharmaceutically accepted composition containing a therapeutically effective amount of the steroid, for example, pregna-1,4,16-trien-3,20-dion-11β,21-diol diacetate.

A preferred embodiment of this invention is a method of treating a disease which is symptomatically characterized by pain, fever, and/or inflammation which comprises the administration to a patient in dosage unit form of between about 0.01 and 5 grams of the steroid per day. On a milligram per kilogram basis, it is preferred to utilize between about 0.5 milligram per kilogram and 70 milligrams per kilogram per day of the steroid compounds prepared following the procedures of this invention. Another embodiment of this invention is the provision of pharmaceutical compositions in dosage unit form which comprise from about 5–500 milligrams and preferably from 25–250 milligrams of the steroids of this invention. In addition to the active steroid ingredient, the pharmaceutical compositions can contain inert pharmaceutically acceptable fillers and carriers. For example, addition of the elements of methanol to the 16-double bond results in the physiologically highly active 16α-methyl steroids, such as 16α-methyl-9α-fluoroprednisolone and 16α-methylcortisol acetate.

This invention also provides a novel steroid compound, pregna-1,4,16-triene-3,20-dion-11β,21-diol diacetate:

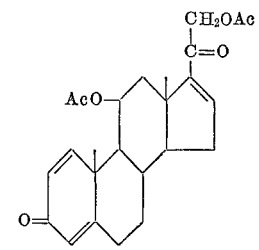

which is prepared using the inventive process in reaction with pregna-1,4-dien-3,20-dion-11β,17α,21-triol triacetate.

The starting materials for this inventive process are the 17α-alkanoyloxy or aroyloxy derivatives of a 17α-hydroxy steroid of the pregnane series. The 17α-hydroxypregnane steroids can be substituted on other positions of the ring with other inert substituents, such as alkyl, halogen, or have bonding in rings other than the A ring, as long as such bonding does not interfere with the dihydrogenation reaction. The A ring itself can have $\Delta^1$ or $\Delta^{1,4}$ bonds. These desired 17α-derivatives can be prepared using any esterification procedure described in the prior art, can be employed. For instance, when the 17α-acetate steroid is desired, the 17α-hydroxyl steroid is acetylated with acetic anhydride. Another esterification is exemplified by the reaction of the 17α-hydroxy steroid with triethylorthoacetate, followed by hydrolysis with oxalic acid in methanol, to yield the 17α-acetate derivative. This latter method is especially effective when the higher esters of four carbons and above are produced or acylation of the 11-hydroxyl is undesirable.

Other suitable 17α-alkanoyloxy derivatives which are operable in the reaction are caproate, valerate, butyrate, caprylate, propionate, and formate. The suitable aroyloxy derivatives include benzoate, p-chlorobenzoate, alkylbenzoate and others. Generally, an acyl radical having 1–8 carbon atoms or a substituted aromatic radical can be used.

During the esterification of the 17α-hydroxy group, other hydroxy groups on the steroid molecule may also be esterified. The presence of ester groups on positions other than the 17α-carbon does not affect the subsequent dehydrogenation reaction at 16,17-carbon.

The process of this invention is the treatment of the 17α-alkanoyloxy or aroyloxy derivative steroid with an alkali metal or alkaline earth metal salt of a lower alkanoic acid, having 1–8 carbon atoms, or of an aromatic acid in a polar orgnic solvent. Suitable solvents are pyridine, tetrahydrofuran, dimethylacetamide, dimethylformamide, and the like.

Suitable lower alkanoic acids include formic, acetic, propionic, butyric, valeric, and caproic. Suitable aromatic acids include benzoic, toluic, naphthoic, and chlorobenzoic. Suitable salts of these acids include potassium acetate, sodium formate, magnesium propionate, propionate, calcium butyrate, potassium valerate, sodium benzoate, lithium caproate, and others.

The amounts of 17α-alkanoyloxy or aroyloxy steroid and salt employed can be varied; for every mole of steroid, from 0.1 to 10 moles of salt are preferably used. Preferably, an approximate 1:4 molar ratio is employed.

The reaction can be conducted at temperatures ranging from 50–200° C. The time necessary for the completion of the reaction is inversely dependent on the temperature, but is generally from 2–32 hours. The reaction can be conveniently monitored by thin layer chromatography to insure total conversion of the steroid under the chosen reaction conditions. Generally, it is preferred to employ a temperature of 80–120° C. for from 4–8 hours.

After completion of the reaction, the reaction mixture is worked up to yield the desired 16-unsaturated steroid. In one mode of work-up, the reaction mixture is quenched by pouring into water. The steroid product is filtered out, dried in vacuo, and purified using conventional methods, recrystallization from a suitable solvent or chromatography being suitable. When the steroid has had esterification at C–11 or C–12, these ester groups can be removed using conventional reactants.

This invention is further described using the following examples:

EXAMPLE 1

Pregna-1,4,16-triene-3,20-dion-11β,21-diol-21-acetate

A mixture of 33 g. of pregna-1,4-diene-3,20-dione-11β,17α,31-triol-17α,21-diacetate, 16.5 g. anhydrous potassium acetate and 210 ml. of dimethylformamide is heated at 100° C. for 7 hours with agitation. After cooling to room temperature, the reaction mixture is poured into 2 liters of water. The precipitate is collected by filtration and dried in vacuo at 110° C. for one hour. After recrystallization from isopropanol, the product, pregna-1,4,16-trien-3,20-dion-11β,21-diol-21-acetate is recovered as a crystalline solid having a melting point of 203–206° C., (λ methanol, max.) 242 mµ.

The same procedure is followed using 16.5 g. of sodium formate and 210 ml. of dimethylformamide to produce the product, pregna-1,4,16-trien-3,20-dion-11β,21-diol-21-acetate.

EXAMPLE 2

Pregna-4,16-dien-3,20-dion-11β,21-diol-21-acetate

A mixture of 5.0 g. of 4-pregnene-3,20-dion-11β,17α,21-triol-17α,21-diacetate, 2.5 g. of anhydrous potassium acetate and 25 ml. of dimethylformamide is heated at 100° C. for 7 hours with agitation. After cooling to room temperature, the reaction mixture is poured into 2 liters of water. The product, pregna-4,16-dien-3,20-dion-11β,21-diol-21-acetate is collected by filtration and dried in vacuo at 110° C. for one hour. An analytical sample, purified by chromatography over alumina using chloroform-benzene elutrient, melts at 145–147° C.

Using the same procedure, except that potassium valerate in tetrahydrofuran is used, the product, pregna-4,16-dien-3,20-dion-11β,21-diol-21-acetate is recovered.

EXAMPLE 3

Pregna-1,4,16-trien-3,20-dion-11β,21-diol-21-acetate

Using the same procedure as in Example 1, 0.717 g. of pregna-1,4-dien-3,20-dion-11β,17α,21-diol-17α-caproate-21-acetate, 0.35 g. of anhydrous potassium acetate and 10 ml. of dimethylformamide are heated for 4½ hours at 98° C. with agitation. After cooling to ambient temperature, the reaction is poured into 100 ml. of water. The product, pregna-1,4,16-trien-3,20-dion-11β,21-diol-21-acetate is collected by filtration and dried in vacuo at 110° C. for one hour. After recrystallization from isopropanol, the melting point is 206–207° C.

The above procedure, when repeated with pregna-1,4-dien-3,20-dion-11β,17α,21-triol-17α-butyrate-21-acetate; pregna-1,4-dien-3,20-dion-11β,17α,21-triol-17α,21-divalerate; and pregna-1,4-dien-3,20-dion-11β,17α, 21-triol-17α-benzoate-21-acetate, results in the production of pregna-1,4,16-trien-3,20-dion-11β,21-diol-21-acetate; pregna-1,4,16-trien-3,20-dion-11β,21-diol-21-valerate; and pregna-1,4,16-trien-3,20-dion-11β,21-dol-21-acetate, respectively.

EXAMPLE 4

Pregna-1,4,16-trien-3,20-dion-11β,21-diol-diacetate

A mixture of 2 g. of pregna-1,4-dien-3,20-dion-11β,17α,-21-triol-triacetate, 2.0 g. of potassium acetate and 15 ml. of dimethylformamide is heated, with agitation, at 97° C. for 8 hours. The reaction mixture is then allowed to cool slowly to room temperature overnight. The reaction mixture is poured into 300 ml. of ice water and stirred for ½ hour. A precipitated solid is removed by filtration, washed with water, and dried in vacuo for 3 hours at 80° C. After recrystallization from isopropanol, a light yellow solid is obtained. The product is identified by IR and thin layer chromatography, as the desired material, pregna-1,4,16-trien-3,20-dion-11β,21-diol-diacetate, melting point, 236–238° C. with softening.

The above procedure, when employed with other triesters of the pregna-1,4-dien-3,20-dion-11β,17α,21-triol series can be used to prepare the corresponding pregna-1,4,16-trien-3,20-dion-11β,21-diol-diester. For instance, the diformate, divalerate, and dicaproate can be prepared in an analogous manner.

We claim:

1. The process of preparing a 16-unsaturated derivative of a 17α-alkanoyloxy or 17α-aroyloxy corticoid having 1,4- or 4-unsaturation in the A ring and an 11β-hydroxy substituent, which comprises reacting said corticoid with an alkali metal or alkaline earth metal salt of a lower alkanoic or aromatic acid in a polar organic solvent until the 16-unsaturated corticoid is formed.

2. The process of claim 1 in which the lower alkanoic acid salt is an alkali or alkaline earth metal salt of a lower alkanoic acid having 1–8 carbon atoms.

3. The process of claim 2 in which the acid salt is potassium acetate.

4. The process of claim 1 in which the polar organic solvent is dimethylformamide.

5. The process of claim 1 in which the molar ratio of the 17α-alkanoyloxy or aroyloxy corticoid and the acid salt is 1 to 0.1–10.

6. The process of claim 5 in which the molar ratio of corticoid and acid salt is approximately 1 to 4.

7. The process of claim 1 in which the reaction temperature is 50–200° C.

8. The process of claim 7 in which the time of reaction is about 2–30 hours.

9. The process of preparing the compound, pregna-1,4,16-trien-(or 4,16-dien-)-3,20-dion-11β,21-diol, or the 21- or 11β,21-diesters thereof, which comprises reacting the compound pregna-1,4-dien-(or 4-en-)-3,20-dion-11β, 21-diol, or the 21- or 11β,21-diesters thereof, having a 17α-alkanoyloxy or aroyloxy substituent with an alkali metal or an alkaline earth metal salt of a lower alkanoic or aromatic acid in dimethylformamide until the 16-unsaturate derivative is formed.

References Cited

UNITED STATES PATENTS 3,068,251  12/1962  Magerlein et al. _ _ _ 260—397.45

ELBERT L. ROBERTS, Primary Examiner